(12) United States Patent
Brilmyer et al.

(10) Patent No.: US 8,722,231 B2
(45) Date of Patent: May 13, 2014

(54) SMART BATTERY SEPARATORS

(75) Inventors: George H. Brilmyer, Johnson City, TN (US); Robert A. Wimberly, Milligan College, TN (US)

(73) Assignee: MP Assets Corporation, Piney Flats, TN (US)

( * ) Notice: Subject to any disclaimer, the term of this patent is extended or adjusted under 35 U.S.C. 154(b) by 1682 days.

(21) Appl. No.: 11/938,327

(22) Filed: Nov. 12, 2007

(65) Prior Publication Data

US 2008/0113259 A1     May 15, 2008

Related U.S. Application Data

(60) Provisional application No. 60/865,658, filed on Nov. 14, 2006.

(51) Int. Cl.
    *H01M 2/18*        (2006.01)
(52) U.S. Cl.
    USPC ........................................ 429/145; 429/248
(58) Field of Classification Search
    USPC ................................................ 429/145, 248
    See application file for complete search history.

(56) References Cited

U.S. PATENT DOCUMENTS

| | | | |
|---|---|---|---|
| 3,862,861 A | 1/1975 | McClelland et al. | |
| 5,744,509 A | 4/1998 | Wilson et al. | |
| 5,952,120 A | 9/1999 | Yu et al. | |
| 6,242,127 B1 | 6/2001 | Paik et al. | |
| 6,506,522 B2 | 1/2003 | Clough | |
| 6,770,401 B1 | 8/2004 | Clough | |
| 2005/0019651 A1* | 1/2005 | Tsai et al. | 429/72 |
| 2005/0249917 A1 | 11/2005 | Trentacosta et al. | |
| 2006/0280906 A1 | 12/2006 | Trentacosta et al. | |

FOREIGN PATENT DOCUMENTS

JP         11339750 A       5/2008

\* cited by examiner

*Primary Examiner* — Maria J Laios
(74) *Attorney, Agent, or Firm* — Luedeka Neely Group, PC

(57) ABSTRACT

A separator for an energy storage cell having a microporous matrix including a reversible porosity-controlling agent. The porosity-controlling agent is selected from the group consisting of agents that change size as a function of temperature, agents that change size as a function of electrolyte concentration, and agents that change size as a function of temperature and electrolyte concentration to provide a change in an overall porosity of the separator.

14 Claims, 3 Drawing Sheets

SMART BATTERY SEPARATORS

RELATED APPLICATIONS

This application claims priority to provisional application Ser. No. 60/865,658, filed Nov. 14, 2006.

TECHNICAL FIELD

The disclosure relates to improved energy storage cell separators, and in particular to improved microporous separators for use in energy storage cells which have characteristics that enable enhanced performance and energy storage cell life under variable operating conditions.

BACKGROUND AND SUMMARY

Rechargeable energy storage cells are used in a variety of applications including gas operated motor vehicles and electric vehicles. Of the applications, electric vehicles such as golf carts, fork trucks, marine applications, floor-sweeper scrubber and recreational vehicles and the like are the most demanding in terms of charge/discharge cycles. Energy storage cells for such electric vehicles are commonly known as "deep cycle" batteries which provide relatively steady power over extended periods of time between charging and which operate in a deep cycling mode of severe discharging as well as daily recharging cycles. Deep cycle energy cells are desirably recharged with little or no supervision. Accordingly, the cells must be capable of multiple charge/discharge cycles without significantly degrading of the power output properties of the cells. Conventional rechargeable energy storage cells, such as automobile and golf cart batteries, have properties which do not lend themselves to the rigorous duty cycles of the deep cycle batteries.

Most energy storage cells of the nature described above contain positive plates or grids made of lead-antimony alloys which are easier to cast and produce stronger electrodes. The antimony also improves the corrosion resistance of the positive plate to acid attack and increases the ability of the battery to recovery from deep discharge cycles. When a lead-acid energy storage cell is deeply discharged the energy storage cell must be recharged immediately or the battery life is compromised. The need for immediate recharging relates to the fact that when a lead-acid energy storage cell is discharged the acid is temporarily consumed and the electrolyte becomes more like water. Under these conditions the active material in the plates may dissolve, and diffuse into the separator, filling the pores with lead ions. Once the pores become filled with lead ions, the effectiveness of the separator is dramatically reduced and electrical shorting of the energy storage cell may occur in a short period of time.

There are several types of separators which are commercially used in rechargeable energy cells. The separators differ by the material composition and include rubber separators, polymeric separators such as polyethylene separators, polyvinyl chloride (PVC) separators, phenolic resorcinol separators, fiberglass separators and resin impregnated cellulosic paper separators. The separators are further classified as microporous separators and macroporous separators.

The microporous separators include separators made of natural rubber, polyethylene, phenolic resin, PVC and polymeric membranes. Macroporous separators include separators made of glass fiber mats, sintered PVC and resin-impregnated cellulosic papers. Of the foregoing, microporous, natural rubber separators typically exhibit the best electrochemical performance characteristics which enhance the overall performance of the energy cell.

There are two primary functional aspects of separators used for energy cells, one is physical and the other electrochemical. The important physical characteristics include high porosity, small mean pore diameter, oxidation resistance, puncture resistance, thermal dimensional stability and low levels of harmful chemical contaminants. Electrochemical characteristics of importance include favorable voltage characteristics, retardation of antimony transfer, acceptable Tafel behavior, and prevention of dendrite growth. The Tafel behavior of an energy storage cell is a determination of the hydrogen and oxygen over-potential shifts in the cell electrolyte compared to pure acid solutions.

Valve regulated lead-acid energy storage cells typically use separators made of 100% non-woven glass fibers that facilitate oxygen recombination. Under certain conditions, the oxygen recombination may become too vigorous causing the energy storage cell to go into thermal runaway. If the charger used for charging the energy storage cell is not temperature compensated, the energy storage cell may eventually melt and, in severe cases, ignite or burn.

Despite the advances made in the art with respect to improved separators, there continues to be a need for separators for energy storage cells which exhibit improved physical and electrochemical properties over conventional separators. For example, in automotive applications there continues to be a need to improve the cold cranking performance of the energy storage cells. Improvements are also desirable for applications such as golf carts which may benefit from increasing the deep cycle life of the energy storage cells designed for such cycling applications. Primary electrochemical energy storage cells may also benefit from improved low temperature properties.

With regard to the above, one embodiment of the disclosure provides a separator for an energy storage cell having a microporous matrix including a reversible porosity-controlling agent. The reversible porosity-controlling agent is selected from the group consisting of agents that change size as a function of temperature, agents that change size as a function of electrolyte concentration, and agents that change size as a function of temperature and electrolyte concentration to provide a change in an overall porosity of the separator.

Another embodiment provides a method for improving an operating characteristic of an energy storage cell. The method includes applying from about 0.05 to about 20 weight percent of a reversible porosity controlling agent to a separator material. An improved separator may be formed from the separator materials and a reversible porosity-controlling agent. The porosity-controlling agent may be selected from agents that change size as a function of temperature, agents that change size as a function of electrolyte concentration, and agents that change size as a function of temperature and electrolyte concentration. The energy storage cell is then operated with the separator.

The separators according to the invention exhibit improved properties as compared to conventional separators. Another advantage of the disclosed embodiments is that the separators may take an active rather than passive role in improving the performance of energy storage cells under variable conditions. Until now, energy storage cell separators have been a passive component of the cells, with the exception of the tri-layer thermal shutdown separator used in the lithium-ion battery industry (see U.S. Pat. No. 5,952,120 assigned to Celgard). The "shutdown" separator is a three-layer structure of stretched polypropylene/poly-ethylene/polypropylene. The internal layer of PE is designed to melt at high temperatures thus increasing the electrical resistance of the storage cell and "shutting down" the energy storage cell. The process of "shutting down" the energy storage cell is irreversible and once this occurs the energy storage cell is non-functional and must be replaced. By comparison, the separators described herein may be used to shut down an energy storage cell under high temperature conditions, and may enable the storage cell to be used again when conditions return to normal. In other words, the separators have substantially reversible properties that enable the energy storage cells to continue to be used, yet provide protection during deep discharge cycles.

Another advantage of the separators and energy storage cells containing the separators as described herein is that the separators may include components that increase the porosity of the separator under relatively low temperature conditions so that increased power from the energy storage cell may be obtained.

BRIEF DESCRIPTION OF THE DRAWINGS

Further advantages of the exemplary embodiments may become apparent by reference to the detailed description of the exemplary embodiments when considered in conjunction with the following drawing illustrating one or more non-limiting aspects of thereof.

DESCRIPTION OF THE EXEMPLARY EMBODIMENT

Separators as described herein may be made of a wide variety of materials including natural and synthetic rubbers, polyolefins, non-woven glass fibers, and the like. Particularly suitable materials for separators according to the disclosure are polymeric materials such as polyolefins. Separators made of polymeric materials may be used with or without the porosity-controlling agents, provided the separators have characteristics that provide expanding or contracting pores under selected conditions as described in more detail below. Other separators that may benefit from the porosity-controlling agent and methods described herein are non-woven glass fiber separators.

One component of a separator according to the disclosure is a particulate filler. The particulate filler may be selected from carbon black, diatomaceous earth and silica particles. A suitable source of silica particles is precipitated silica, available from PPG Industries, Inc. of Pittsburgh, Pa., Rhodia Silica Systems of Lyon, France, and Evonik-Degussa GmbH of Duisseldorf, Germany.

Separators made of such as non-woven glass fiber separators, polyethylene separators and the like may benefit from the inclusion of reversible porosity-controlling agent as described below.

Suitable porosity-controlling agents that may be used according to exemplary embodiment of the disclosure may be selected from agents that shrink at a greater rate than pores in the separator shrink as a temperature is reduced, agents that shrink in normal battery electrolyte concentrations and expand when the electrolyte concentration in contact with the separator is reduced, and agents that expand in response to rising temperatures and contract in response to decreasing temperatures.

Accordingly, the porosity-controlling agents are used in an amount sufficient to affect the porosity of the separator under varying conditions. It is highly desirable that the expansion and contraction properties of the porosity-controlling agent and/or the separator be substantially reversible. For example, as the electrolyte concentration of an energy storage cell electrolyte decreases, the porosity-controlling agent expands and the separator porosity decreases. Conversely as the electrolyte concentration of the electrolyte increases, the porosity-controlling agent contracts and the separator porosity increases.

Figure 1:
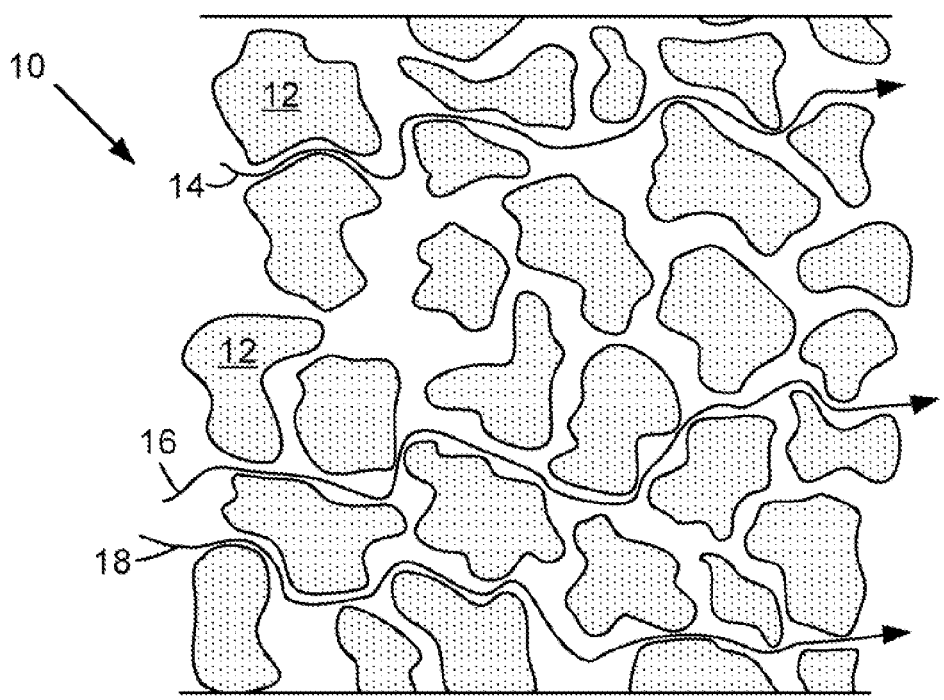
FIG. 1 is a schematic cross-sectional representation of a prior art separator.
Figure 2:
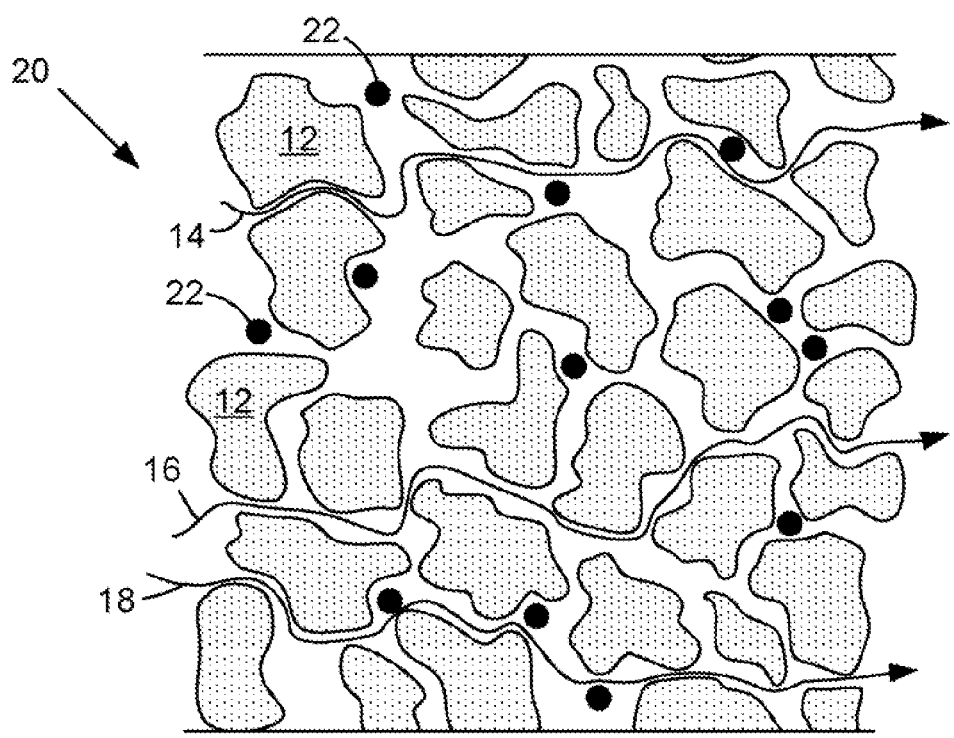
FIG. 2 is a schematic cross-sectional representation of a separator including a porosity controlling agent at a first operating condition.
Figure 3:
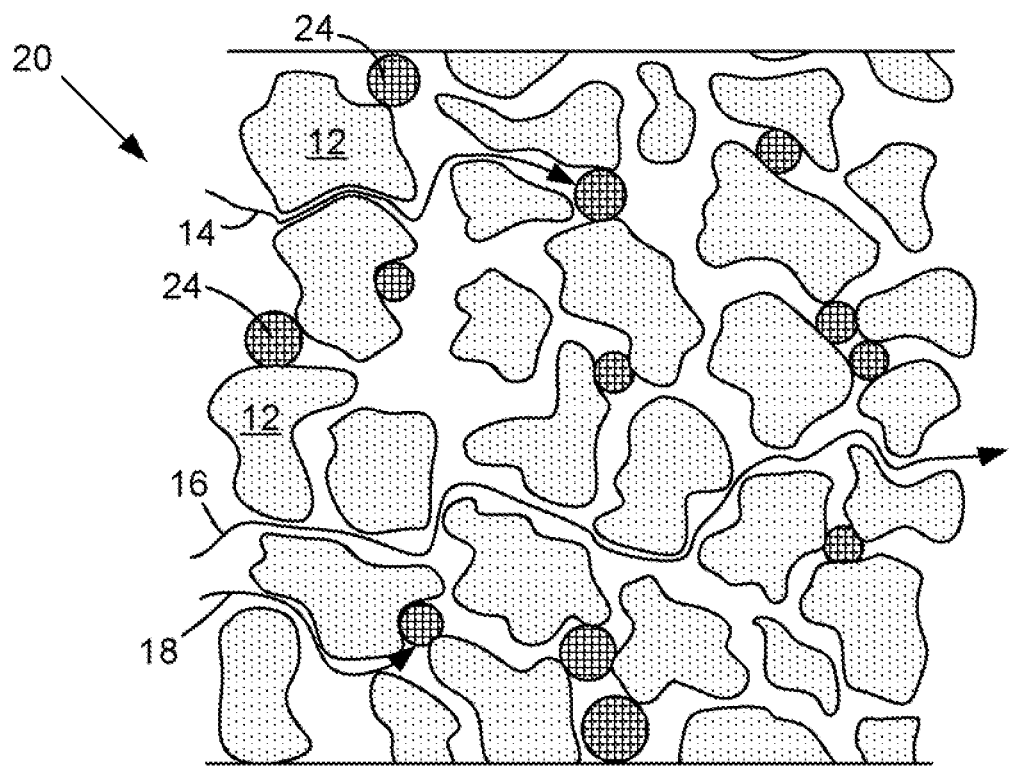
FIG. 3 is a schematic cross-sectional representation of a separator including a porosity controlling agent at a second operating condition.

The porosity of a separator may be better understood by referring to FIGS. 1-3. FIG. 1 is a schematic cross-sectional representation of a portion of a prior art separator 10. The separator 10 may include pore forming particles 12 or fibers that provide multiple flow paths, indicated by the arrows 14, 16, and 18 through the separator. (For illustration purposes only three paths are shown). The overall porosity of the separator may be determined by a mercury intrusion method described by Ritter, H. L., and Drake, L. C, in *Ind. Eng. Chem. Anal.* Ed., Vol. 17, page 787 (1945). According to the method, mercury is forced into different sized pores in the separator by varying the pressure exerted on the mercury, i.e., low pressure being used to fill large sized pores and higher pressures being used to fill small sized pores. The total pore volume is then determined and the pore volume distribution is calculated from a measure of mercury in the various sized pores and the pressure exerted. It is desirable that the separator have a porosity ranging from about 0.6 to about 2.0 cubic centimeters per gram by the mercury intrusion method.

In FIGS. 2 and 3, porosity controlling particles are included in the separator 20. The porosity controlling particles may have a first size indicated by the particles 22 in FIG. 2, and a second size indicated by the particles 24 in FIG. 3. In FIG. 2, the particles 22 may be in an unexpanded or contracted state thereby enabling the separator 20 to have a first porosity indicated by the arrows 14, 16 and 18 as in FIG. 1. In FIG. 3, the particles 24 are in expanded state thereby blocking paths 14 and 18 through the separator 20. Only one path 16 is open in the separator illustrated in FIG. 3. Accordingly, the porosity of the separator in FIG. 3 is less than the porosity of the separators in FIGS. 1 and 2.

The porosity controlling particles included in the separator 20 may be selected from particles that expand or contract in response to an electrolyte concentration, such as super absorbent polymers (SAP), or materials that expand or contract in response to temperature. By selecting a porosity-controlling agent that expands as the concentration of the electrolyte decreases, the porosity of the separator may be decreased as illustrated by expansion of particles 22 in FIG. 2 to the particles 24 in FIG. 3. As the porosity of the separator 20 is decreased, the amount of lead ions diffusing into the separator may be decreased. Use of a SAP in a separator for a lead acid battery may provide suitable decrease in separator porosity as the acid concentration of the electrolyte decreases. For example, SAP such as the sodium salts of crosslinked polyacrylic acid available from Emerging Technologies, Inc. of Greesboro, N.C. under the trade name NORSOCRYL D-60 and from BASF Corporation of Florham Park, N.J. under the trade name LUQUASORB 1260 may swell to as much or more than 1000 times their initial size in water and then may shrink back to normal size under acidic conditions.

Such an SAP material may be used in a lead-acid battery separator to protect the battery from extremely deep discharges such as in automobile applications when the driver of the automobile accidentally leaves the lights on for an extended period of time. When the lights are left on for an extended period of time, the battery becomes fully discharged and the specific gravity of the electrolyte slowly drops and approaches 1.000. At the low specific gravities, the selected SAP may swell at or below about 1.010 SG, closing off flow paths in the separator and protecting the battery. When the battery is recharged and the specific gravity of the electrolyte increases, the SAP shrinks to its normal size thereby opening the flow paths in the battery and enabling normal operation of the battery. Various amounts of SAP material may be added to the separator to control the degree of porosity control. High levels of SAP may be used to fully block the flow paths or lower amounts may be used to attenuate the effect.

Likewise, a different SAP polymer may be selected for deep cycle batteries, for example, batteries that are used in golf carts, wherein the battery electrolyte in the discharged condition normally does not drop below about 1.150 SG, because the battery is typically discharged to only about 80% of its capacity. It is well known in the lead-acid battery industry that the deeper a battery is discharged the lower the cycle life. For example, a battery that delivers 2,000 cycles to a 50% depth of discharge (DoD) may only deliver 400 cycles at 100% DoD. In this case, an SAP polymer might be selected that swells at a specific gravity below about 1.150 thus limiting the DoD to about 80% despite attempts to further discharge the battery. Use of such porosity-controlling polymers may therefore protect the battery from over discharge, thereby increasing battery life.

The following non-limiting examples are provided to further illustrate one or more aspects of the exemplary embodiments.

Example 1

Figure 4:
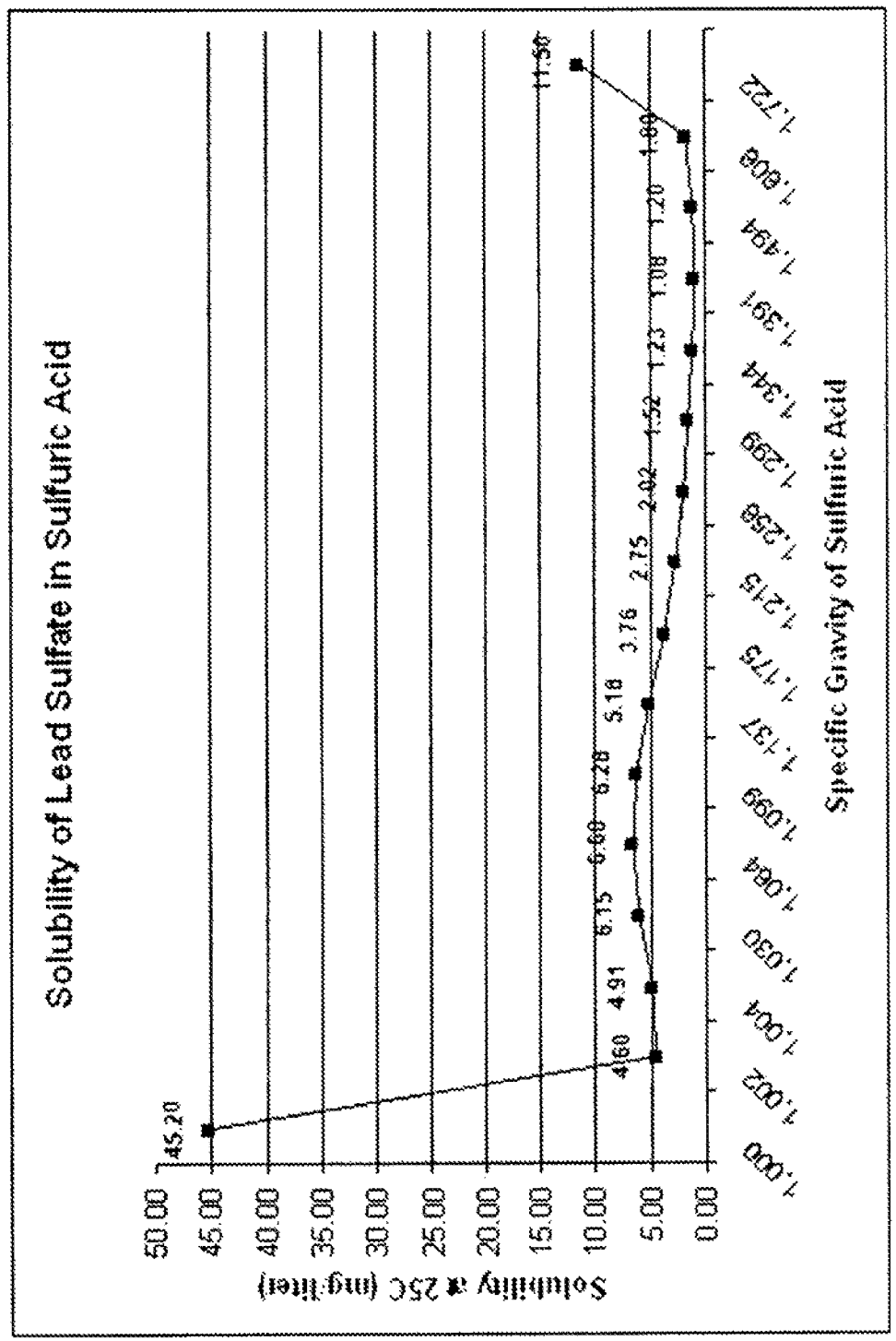
FIG. 4 is a graphical illustration of solubility of lead sulfate in sulfuric acid over a range of acid concentrations.

When a lead-acid battery is discharged the sulfuric acid electrolyte is temporarily consumed as the positive and negative plates are both converted into lead-sulfate from lead-dioxide and lead respectively. As the discharge proceeds, the formation of lead-sulfate continues and the concentration of the acid decreases making the electrolyte more like water. The acid concentration when measured in units of specific gravity begins at about 1.280 for a fully charged battery and tends toward a specific gravity of 1.000 when the battery is fully discharged. It is widely known that when a lead-acid battery is very deeply discharged the battery should be recharged immediately or the battery life may be compromised. The reason for this is shown in FIG. 4. This figure illustrates a sharp increase in solubility of lead sulfate when the specific gravity of the electrolyte is below about 1.004. Under these conditions the lead-sulfate in the plates may dissolve, diffuse into the separator filling the pores with lead ions. When recharged the lead ions in the pores are converted into metallic lead which may cause short circuits between the positive and negative plates and thus battery failure.

One method for minimizing the tendency for lead ions to enter the pores of the separator during deep discharges may be to use a reversible pore controlling agent in the separator. Such an agent would be selected from materials that swell or expand as the electrolyte concentration decreases. Accordingly, materials may be used, include but are not limited to, the alkali metal salts of polyacrylic acid, generally known as super absorbing polymers, and alkali metal salts of sulfonated perfluoroethylene commercially available from E. I. du Pont de Nemours and Company of Wilmington, Del. under the trade name NAFION.

At cold cranking temperatures the performance of a starting, lighting, and ignition (SLI) battery may be limited by the electrical resistance (ER) of the separator. At relatively cold temperatures, the ER of the separator is controlled by the porosity of the separator and the conductivity of the sulfuric acid through the separator. In order to lower the ER at the relatively cold temperatures, the porosity of the separator should increase. One method for controlling the ER of the battery is to use porosity controlling particles when making the separator. The porosity controlling particles are selected from materials that shrink in response to reduced temperatures more than the pores in the separator shrink. Such a material may be found by comparing thermal properties of a variety of materials such as the linear coefficient of thermal expansion. Hence, as the temperature decreases, the porosity of the separator increases thereby decreasing the ER of the separator.

Example 2

Separators including electrolyte-sensitive porosity-controlling agents have been made from formulations as set forth in the following table (Samples 1-4). The Control sample did not contain a porosity-controlling agent. In the table, the masterbatch was made from a natural rubber component mixed with pepton in a Banbury mixer until soft and pliable. The other ingredients were mixed with the masterbatch in a Brabender mixer for three to four minutes at a temperature of 24° C. In the table PHR is parts per hundred parts of rubber, DPG is diphenyl guanidine accelerator, SAP 1 is a sodium salt of poly-acrylic acid superabsorbent polymer available from BASF Corporation under the trade name LUQUASORB 1260, and SAP 2 is a sodium salt of poly-acrylic acid superabsorbent polymer available from Emerging Technologies Inc. under the trade name NORSOCRYL D-60. Each of the samples was milled, calendared, and dried under the conditions shown in Table 2. An electron beam was used to cure the calendared samples at 30 milliamps and 30 feet per minute. Properties of the Control and Samples 1-4 are given in Table 3.

TABLE 1

| Ingredients | Control | Sample 1 | Sample 2 | Sample 3 | Sample 4 |
|---|---|---|---|---|---|
| Masterbatch (PHR) | 104.1 | 104.1 | 104.1 | 104.1 | 104.1 |
| Precipitated Silica (PHR) | 143.3 | 143.3 | 143.3 | 143.3 | 143.3 |
| Water (PHR) | 235.9 | 265 | 290 | 290 | 290 |
| DPG (PHR) | 2 | 2 | 2 | 2 | 2 |
| SAP 1 (PHR) | 0 | 0 | 0 | 13 | 17 |
| SAP 2 (PHR) | 0 | 10 | 13 | 0 | 0 |
| Total (PHR) | 485.3 | 524.4 | 552.4 | 552.4 | 556.4 |

TABLE 2

| Sample | MILLING ROLL TEMPS (° C.) | | CALENDER ROLL TEMPS (° C.) | | BATH (° C.) TEMP. | DRY-LAB OVEN | |
|---|---|---|---|---|---|---|---|
|  | FRONT | BACK | TOP | BOTTOM |  | TIME (min) | TEMP. (° C.) |
| Control | 170 | 150 | 135 | 150 | 75 | 20 | 87 |
| Sample 1 | 170 | 150 | 135 | 140 | 75 | 23 | 87 |
| Sample 2 | 170 | 150 | 135 | 135 | 75 | 25 | 87 |
| Sample 3 | 170 | 150 | 135 | 135 | 75 | 25 | 87 |
| Sample 4 | 170 | 150 | 135 | 135 | 75 | 25 | 87 |

TABLE 3

| ANALYSIS | CONTROL | Sample 1 | Sample 2 | Sample 3 | Sample 4 |
|---|---|---|---|---|---|
| Moisture, % | 3.35 | 4.71 | 5.47 | 4.90 | 10.31 |
| Mercury Intrusion Porosity |  |  |  |  |  |
| Total Hg Porosity, mL/g | 0.53 | 0.58 | 0.54 | 0.54 | 0.50 |
| Mean Pore Dia. µm | 0.08 | 0.08 | 0.06 | 0.06 | 0.06 |
| Total Pore Area µm$^2$ | 30.81 | 31.47 | 33.91 | 32.93 | 30.91 |
| Bulk Density, g/mL | 0.78 | 0.76 | 0.77 | 0.79 | 0.83 |
| Electrical Resistance |  |  |  |  |  |
| mOhms-in$^2$ | 43.2 | 33.8 | 30.4 | 22.0 | 17.5 |
| mOhms-in$^2$/mil of back web | 2.31 | 1.35 | 1.33 | 1.05 | 0.80 |
| Web Thickness, inches | 0.02 | 0.03 | 0.02 | 0.02 | 0.02 |
| OA Thickness, inches | 0.1 | 0.1 | 0.1 | 0.1 | 0.1 |
| Mullen, psi | 40 | 23 | 25 | 22 | 60 |
| Wetting, minutes | 52 | 45 | 30 | 22.5 | 48 |
| Puncture lbs. | 1.40 | 1.90 | 1.54 | 1.20 | 1.27 |
| Tensile, #break MD | 0.71 | 3.26 | 2.30 | 8.75 | 2.10 |
| Elongation, % | 29.5 | 13.2 | 13.5 | 12.5 | 36.0 |
| % Swell MD | 1.77 | 2.79 | 2.30 | 1.55 | 2.81 |
| % Swell CD | 2.69 | 3.81 | 3.90 | 3.33 | 4.56 |
| METHANOL: 24 HR |  |  |  |  |  |
| % Swell MD | 0.7 | 0.7 | 0.15 | 0.4 | 0.7 |
| % Swell CD | 0.9 | 0.6 | 0.6 | 0.6 | 1.0 |
| % Alcohol porosity | 48 | 52 | 48 | 52 | 47 |

As shown by the properties in Table 3, all of the separator samples 1-4 containing the superabsorbent polymers had lower resistance properties than the Control sample. The Samples 3 and 4 containing SAP 2 had the best resistance properties at loadings of 13 and 17 PHR of the SAP 2 polymer. The Samples 1-4 containing the SAP 1 and 2 polymers also showed increased swelling and loss of porosity when compared to the Control sample when subjected to electrolyte concentrations below 1.020 specific gravity.

Example 3

At cold cranking temperatures the performance of a starting, lighting, and ignition (SLI) battery is typically limited by the electrical resistance (ER) of the separator. At relatively cold temperatures, the ER of the separator is controlled by the porosity of the separator and the conductivity of the sulfuric acid through the separator. In order to lower the ER at the relatively cold temperatures, the particles in the separator should contract in size. Accordingly, particles having a positive co-efficient of thermal expansion (i.e., a material that contracts in the cold) are provided. At freezing temperatures the porosity of the separator increases thereby decreasing the ER of the separator. In the case of an automotive battery separator, the particles 12 are actually ultra-high molecular weight polyethylene that has a coefficient of linear thermal expansion (CLTE) of $130 \times 10^{-6}/°$ K. Suitable materials for particles 22 and 24 may include, but are not limited to, polyvinylidene chloride (CLTE of $190 \times 10^{-6}/°$ K.) and low molecular weight polyethylene (CLTE of $220 \times 10^{-6}/°$ K.).

Example 4

Valve regulated lead-acid (VRLA) batteries use a separator comprised of 100% non-woven glass fibers that facilitate oxygen recombination. Under certain conditions the oxygen recombination becomes too vigorous and the battery may go into thermal runaway. If the charger is not temperature compensated the battery melts and eventually burns.

A battery separator that is temperature sensitive and stops thermal runaway in VRLA batteries may be used to prevent thermal runaway. Accordingly, a separator including a material having a positive co-efficient of thermal expansion (i.e., a material that expands at elevated temperatures) is provided. As with the particles illustrated in FIGS. 2 and 3, the particles 22 expand to the size of particles 24 under increasing temperature conditions and decrease from the particles 24 in FIG. 3 to the particles 22 in FIG. 2 under decreasing temperature conditions. It is desirable that the particles 22 and 24 have a coefficient of thermal expansion greater than the coefficient of thermal expansion of the particles 12 comprising the separator 20. In the case of an AGM VRLA separator, the particles 12 are typically glass fibers having a coefficient of linear thermal expansion (CLTE) of about $8.5 \times 10^{-6}/°$ K. Suitable materials for particles 22 and 24 include, but are not limited to, polypropylene (CLTE of 100 to $220 \times 10^{-6}/°$ K.), ABS (CLTE of 60 to 130×10⁻⁶/° K.) and polyethylene terephthalate (PET) (CLTE of about 60×10⁻⁶/° K.).

Figure 5:
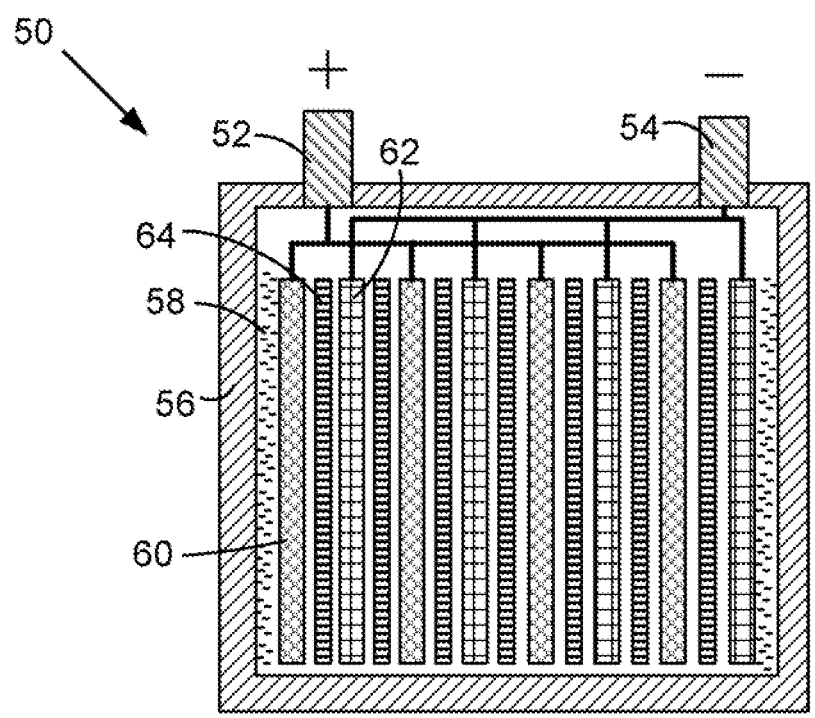
FIG. 5 is a schematic cross-sectional representation of an energy storage cell containing a separator according to embodiments of the disclosure.

FIG. 5 is a schematic cross-sectional view of an energy storage cell 50 according to embodiments of the disclosure. The cell 50 includes positive and negative terminals 52 and 54 extending through a case 56. The case 56 encloses an electrolyte 58, the positive and negative electrodes 60 and 62 and separators 64 between adjacent electrodes 60 and 62. The separators 64 may include one or more of the porosity controlling agents described above to increase or decrease the electrical resistance between the electrodes 60 and 62 by reversibly increasing or decreasing the porosity through the separator 64.

At numerous places throughout this specification, reference has been made to a number of U.S. Patents and publications. All such cited documents are expressly incorporated in full into this disclosure as if fully set forth herein.

The foregoing embodiments are susceptible to considerable variation in its practice. Accordingly, the embodiments are not intended to be limited to the specific exemplifications set forth hereinabove. Rather, the foregoing embodiments are within the spirit and scope of the appended claims, including the equivalents thereof available as a matter of law.

The patentees do not intend to dedicate any disclosed embodiments to the public, and to the extent any disclosed modifications or alterations may not literally fall within the scope of the claims, they are considered to be part hereof under the doctrine of equivalents.

What is claimed is:

1. A separator for a lead-acid energy storage cell, the separator comprising: a microporous matrix having a plurality of flow paths defined by interconnected pores of the separator and including a reversible porosity-controlling agent provided as particles within the flow paths of the matrix, wherein the porosity-controlling agent is selected from the group consisting of agents that change size as a function of temperature, agents that change size as a function of electrolyte concentration, and agents that change size as a function of temperature and electrolyte concentration to provide a change in an overall porosity of the separator, wherein expansion of the particles reduces the number of flow paths thereby increasing electrical resistance through the separator and contraction of the particles increases the number of flow paths thereby decreasing the electrical resistance through the separator.

2. An energy storage cell comprising the separator of claim 1.

3. The energy storage cell of claim 2, wherein the energy storage cell is selected from primary and secondary energy storage cells.

4. The separator of claim 1, wherein the reversible porosity-controlling agent comprises a super absorbing polymer.

5. The separator of claim 4, wherein the separator comprises from about 0.05 to about 20 percent by weight of the super absorbing polymer.

6. The separator of claim 4, wherein the super absorbing polymer comprises an alkali metal salt of a crosslinked polyacrylic acid.

7. The separator of claim 1, wherein the microporous matrix comprises a polyolefin material.

8. The separator of claim 7, wherein the microporous matrix further comprises cured rubber and precipitated silica fillers.

9. The separator of claim 1, wherein the microporous matrix comprises a fiberglass web impregnated with cured natural rubber and a filler.

10. The separator of claim 1, wherein the microporous matrix comprises a non-woven fiberglass material.

11. The separator of claim 1, wherein the reversible porosity-controlling agent comprises a sodium salt of a crosslinked polyacrylic acid.

12. A method for improving an operating characteristic of lead-acid energy storage cell, comprising:
providing a separator material having a plurality of flow paths defined by interconnected pores of the separator;
applying from about 0.05 to about 20 weight percent of a reversible porosity controlling agent to the separator material;
forming a separator from the separator material and the porosity-controlling agent; and
operating the energy storage cell with the separator,
wherein the porosity-controlling agent is selected from the group consisting of agents that change size as a function of temperature, agents that change size as a function of electrolyte concentration, and agents that change size as a function of temperature and electrolyte concentration and wherein expansion of the particles reduces the number of flow paths thereby increasing electrical resistance through the separator and contraction of the particles increases the number of flow paths thereby decreasing the electrical resistance through the separator.

13. The method of claim 12, wherein the operating characteristic includes an overall porosity of the separator.

14. The method of claim 12 wherein the energy storage cell is selected from the group consisting of primary and secondary batteries.

* * * * *